March 15, 1960     T. P. FOLEY     2,928,145
MAGNETIC SEALING GASKET
Filed Feb. 28, 1958

INVENTOR.
THOMAS P. FOLEY
BY
HIS ATTORNEY

United States Patent Office 2,928,145
Patented Mar. 15, 1960

2,928,145

MAGNETIC SEALING GASKET

Thomas P. Foley, Louisville, Ky., assignor to General Electric Company, a corporation of New York Application February 28, 1958, Serial No. 718,298

8 Claims. (Cl. 20—69)

The present invention relates to magnetic sealing gaskets and is more particularly concerned with gaskets for use in domestic refrigerators, food freezers, or the like for the purpose of sealing the space between the inner side of the door and the outer surface of the refrigerator cabinet surrounding the access opening.

To be effective, such gaskets must be resilient enough to correct for surface irregularities occurring at any point around the door or access opening, must resist permanent deformation or set, and, in order that the closed door does not present a child safety hazard, the gasket should require only a low compressive force to form and maintain an effective seal so that relatively weak latching means can be used.

It is an object of the present invention to provide a sealing gasket for refrigerator doors or the like which is sufficiently resilient to correct for surface irregularities and which is so constructed that it will not become permanently deformed or set during use.

A further object of the invention is to provide a sealing gasket including magnetic means for preventing the gasket from becoming permanently set or deformed during compression thereof.

Another object of the invention is to provide a flexible tubular gasket including magnetically attractable means for providing most of the gasket sealing forces and for returning the gasket to its normal or non-sealing shape or configuration as soon as the gasket compressing force is removed.

Further objects and advantages of the present invention will become apparent as the following description proceeds and the features of novelty which characterize the invention will be pointed out with particularity in the claims annexed to and forming a part of this specification.

In carrying out the objects of the present invention there is provided a compressible sealing gasket comprising a member of non-magnetic material having two pivoting side portions and a flexible convex face portion interconnecting the side portions. Magnetically attractable means are carried by the side walls or portions for biasing them towards one another both for the purpose of maintaining the face portion in sealing engagement with a contacting surface and for the purpose of returning the gasket face portion to its original or non-sealing shape upon the removal of the compressing forces. In a preferred embodiment of the magnetically attractable means carried by the gasket side walls, the same magnetically attractable means is also employed for holding a door member in closed position relative to a cabinet by means of a magnetic surface provided on the member which does not carry the gasket.

For a better understanding of the invention reference may be had to the accompanying drawings in which.

Figure 1:
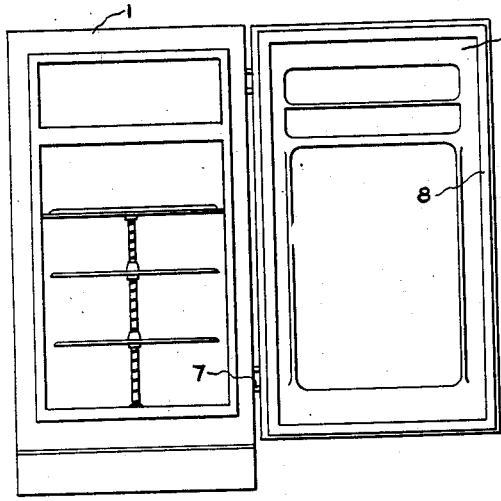
Fig. 1 illustrates a refrigerator embodying the gasket of the present invention.

Referring to Fig. 1 there is show a refrigerator including a cabinet member 1 and a door member 2, the cabinet including an outer shell or wall 3 and an inner liner 4. The space between the inner and outer portions of the cabinet is filled with suitable insulation 5.

The closure member or door 2 provided for closing the access opening of the cabinet is hingedly supported along one edge by hinges 7 and in order to seal the space between the door and the access opening to the cabinet there is provided a gasket 8 which is fastened to either the door member or the cabinet member, and which seals the space between these two members when the door is in the closed position relative to the cabinet.

Figure 2:
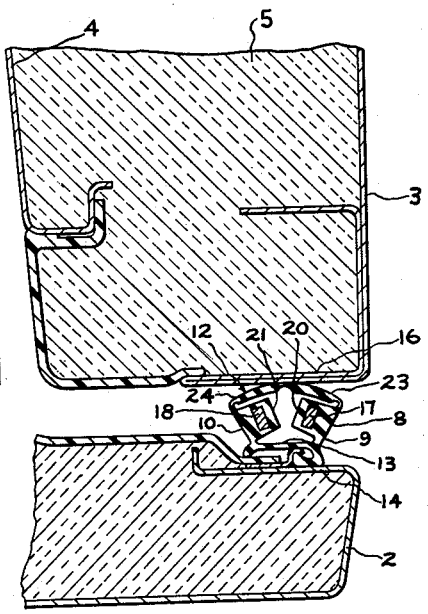
Fig. 2 is a sectional view illustrating details of the gasket construction as arranged between the edge of a refrigerator door and the adjacent portion of the refrigerator cabinet with the door in the closed position.

Referring more particularly to Fig. 2 of the drawing, the gasket member of the present invention, which is composed of non-magnetic material such as rubber or the like, include two side wall portions 9 and 10 and a face portion 12 interconnecting these side wall portions. The side wall portions 9 and 10 are pivotally supported as through a base portion 13 on an inwardly extending flange 14 provided on the door 2 so that the gasket will contact the inwardly extending flange 16 of the cabinet when the door is closed.

Preferably, the gasket is extruded from rubber or the like in the form of a hollow tubular member so that the side portions 9 and 10, the face portion 12 and the base portion 13 are interconnected, the face portion 12 being normally convex and of such a width that the side portions 9 and 10 can pivot about their connections to the base 13 thereby permitting lateral movement of the side portions or walls 9 and 10 in a direction away from one another upon the application of the sealing pressure to the face portion 12 of the gasket.

Figure 3:
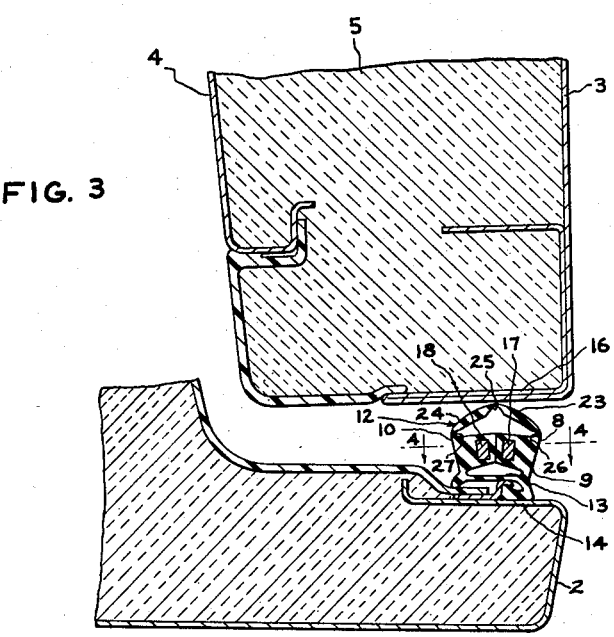
Fig. 3 is a view similar to Fig. 2 with the door in a partially open position showing the normal or non-sealing configuration of the gasket of Fig. 2.

In order to provide the desired sealing forces to maintain the face portion 12 of the gasket in contact with the mating surface 16 on the cabinet when the door is in its closed position relative to the cabinet member and also to return the gasket to its normal or non-sealing configuration as shown in Fig. 3 when the door is opened, there are provided magnetically attractable means 17 and 18 carried by the side walls of the gasket. The means 17 and 18 are mutually attractable so that they bias the side walls toward one another to resist compression of the gasket when the door is closed and return the gasket to its normal configuration when the door is opened. At least one of these magnetically attractable means 17 and 18 and preferably both are composed of permanent magnetic material so arranged in the gasket side walls 9 and 10 that they are attracted to one another. In the preferred embodiment of the invention, at least part of the inwardly extending flange 16 of the cabinet member comprises a magnetic material such as steel so that when the door is closed, the magnetic forces between means 17 and 18 and the flange 16 will hold the door closed.

Figure 4:
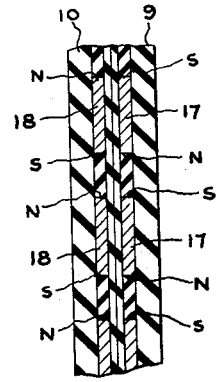
Fig. 4 is a sectional view along lines 4—4 of Fig. 3 disclosing one arrangement of the magnetically attractable means in the gasket structure.

The magnetically attractable means 17 and 18 may for example comprise a plurality of Alnico or magnetic ferrite members arranged in spaced relationship as shown in Fig. 4 of the drawing with the magnetic poles of the magnets in one side wall opposite the poles of opposite polarity in the other side wall, or in other words, in a position such that the magnets in the opposite walls are mutually attractive. Alternatively, and particularly with some of the magnetic ferrites the opposed faces of the magnetic elements carried by the side walls 9 and 10 may be of the opposite polarity and hence mutually attractable.

Preferably, the gasket 8 is of such configuration that the inner surfaces 20 and 21 of the side walls 9 and 10 are in spaced relationship when the door is in its closed position and are in contact with one another as shown in Fig. 3 when the door is in its open position or in other words when the gasket is not compressed. Further, the face portion 12 of the gasket is so constructed that it has a relatively convex shape when the gasket is not compressed as shown in Fig. 3. Further, for the purpose of providing the desired flexing action of the face portion, it is preferably composed of two longitudinally extending sections 23 and 24 which are relatively thick or relatively non-flexible as compared with both the mid section 25 of the gasket face as well as the sections 26 and 27 connecting the face portion to the respective side walls 9 and 10. By providing these less flexible longitudinally extending sections 23 and 24, flexing of the gasket face 12 during its movement from the sealing to the non-sealing position and back again is restricted to the narrow and more resilient or flexible lines 25, 26 and 27 whereby buckling or wrinkling of the gasket face portion 12 is prevented.

Contact of the inner surfaces 20 and 21 of the side walls 9 and 10 of course limits the movement of the gasket side walls in one direction while the length of the face 12 limits the outward movement of the side walls under the application of compressive forces resulting from closure of the door.

The advantages of the present invention will become apparent from the consideration of the operation of the gasket of the present invention. With reference to Fig. 3 it will be seen that when the door is in an open or non-sealing position, the normal or non-sealing configuration of the gasket is such that the side walls 9 and 10 are attracted towards one another with their inner faces 20 and 21 limiting the movement of the side walls in this direction. At the same time the face portion 12 is flexed outwardly into a more convex form. Upon the application of the compressive force when the door is closed relative to the cabinet member, contact of the surface 16 of the cabinet with the gasket face causes the face to depress and straighten. Due to the relatively non-resilient sections 23 and 24 of the gasket face, these forces cause the side walls 9 and 10 to move apart against the attractive forces of the magnetically attractable means 17 and 18. Thus it will be seen that the sealing force of the gasket is provided primarily by the attractive forces between the members 17 and 18 carried by the gasket side walls and this sealing or compressive force of the gasket can be controlled by proper selection of the magnetically attractable means.

While the gasket of the present invention can be used solely for sealing purposes on refrigerator cabinets or the like employing a suitable mechanical latch for maintaining the door in a closed position, it will be seen that by proper positioning of the magnetically attractable means 17 and 18 within the gasket relative to one another and to the magnetic cabinet flange 16 when the door is in its closed position, the lines of magnetic force from the magnetically attractable means passing through flange 16 can also be employed to hold the door in a sealing position relative to the cabinet. In other words as the door is closed and the side walls 9 and 10 are caused to pivot away from one another, some of the magnetic lines of force normally flowing between the magnetically attractable means 17 and 18 will be transferred to the magnetic face portion 16 of the cabinet as it comes closer to the door thus causing the gasket structure and hence the door to be attracted to the cabinet. The magnetic gasket then functions not only as a means for providing a low sealing force but also as a means for holding the door in a closed position relative to the cabinet member. In this connection, when the entire gasket about the door periphery is provided with magnetic elements a slight closing force will cause the door to move to a closed position due to the attractive forces of the magnets. These forces cause first the hinge side and thereafter the remaining portions of the gasket to progressively become attracted to the cabinet face as the successive magnets move towards the cabinet face. A further advantage of the gasket arrangement of the present invention is that upon the application of a compressive load during door closing, the gasket side walls deflect sideways so that the magnetic elements 17 and 18 are caused to move apart with the result that the attractive forces between the two are decreased. Thus the gasket tends to become softer as the side walls separate since the attractive forces between the magnetic means decreases very rapidly with increased spacing. When the cabinet has a magnetic face portion, the lines of force will simultaneously transfer to the magnetic portion at an increasing rate as the gasket becomes compressed.

In other words by properly selecting the distances between the magnetic means 17 and 18 and the distance between these magnetically attractable means and the magnetic face of the cabinet when the door is in its closed position there is available an increasing gasket compression due to the magnetic flux entering the magnetic portion of the cabinet face. This force is increasing as the total load required by the gasket for sealing purposes is decreasing due to the fact that the magnetically attractable means 17 and 18 are moving farther apart. Thus there is provided an ideal sealing system which insures a good contact between the gasket face and the cooperating surface of the cabinet and at the same time provides a relatively low "latching" force such that the closed door can be readily opened for example by a child trapped within the cabinet.

While there has been shown and described a specific embodiment of the present invention, it is to be understood that the invention is not limited to the particular construction and it is intended by the appended claims to cover all modifications within the spirit and scope of the invention.

What I claim as new and desire to secure by Letters Patent of the United States is:

1. A compressible sealing gasket comprising a member of non-magnetic material having two pivoting side portions, a flexible face portion interconnecting said side portions, and magnetically attractable means positioned in both of said side portions, the magnetically attractable means in at least one of said side portions comprising permanent magnets for magnetically biasing said side portions towards one another.

2. A compressible sealing gasket comprising a member of non-magnetic material having opposed pivoting side portions, a convex flexible face portion interconnecting said side portions, and magnets arranged in each of said side portions for magnetically biasing said side portions towards one another.

3. A compressible sealing gasket comprising a member composed of non-magnetic material and including two side portions and a flexible convex face portion interconnecting said side portions, said face portion and the connections thereof to said side portions permitting lateral movement of said side portions in a direction away from one another upon application of a sealing pressure to said face portion and magnets arranged in each of said side portions for magnetically biasing said side portions toward one another.

4. A compressible sealing gasket comprising a member composed of non-magnetic material and including two pivotally supported side portions and a flexible convex face portion interconnecting said side portions, said face portion and the connections thereof to said side portions permitting pivotal movement of said side portions in a direction away from one another upon application of a compressive force to the face portion of said gasket and magnetic means arranged in said side portions for magnetically biasing said side portions toward one another.

5. A compressible sealing gasket comprising a member composed of a non-magnetic material and including a base portion, two side portions pivotally connected to said base portion and a flexible convex face portion interconnecting said side portions, said face portion and the connections thereof to said side portions permitting lateral movement of said side portions in a direction away from one another upon application of a sealing pressure to said face portion and magnetic means arranged in said side portions for magnetically biasing said side portions toward one another, said face portion including longitudinally extending relatively non-flexible sections connected to each other and to said side walls by relatively flexible sections whereby transverse wrinkling of said face portion is prevented.

6. A cabinet member having an access opening, a closure member for closing said opening, a sealing gasket mounted on one of said members and adapted to contact a surface portion of magnetic material on the other member to seal the space between said members when the closure member closes said opening, said gasket comprising side walls and means connected to one edge of each of said side walls for pivotally supporting said side walls on said one member, a flexible, normally convex face portion interconnecting the other edges of said side walls and adapted to abut against the surface portion composed of magnetic material on the other of said members and to be flexed by said one of said members when said closure member closes said opening, flexing of said face portion causing said side walls to pivot away from each other, magnetically attractable means arranged in each of said side walls, the magnetic attractable means in at least one of said side walls being composed of permanent magnet material whereby said side walls are magnetically attracted to one another for moving said side walls toward one another and returning said face portion to its normal convex shape when said closure member is open, the relative spacing of said permanent magnet material and said surface portion of magnetic material on said other of said members being such that when said closure member is closed the attractive forces between said surface of magnetic material and said permanent magnet material is sufficient to hold said closure member in the closed position.

7. A cabinet member having an access opening, a closure member for closing said opening, a sealing gasket mounted on one of said members and adapted to contact the other member to seal the space between said members when the closure member closes said opening, said gasket comprising side walls and means connected to one edge of each of said side walls for pivotally supporting said side walls on said one of said members, a flexible, normally convex face portion interconnecting the other edges of said side walls and adapted to abut against a surface composed of magnetic material on the other of said members and to be flexed by said other member when said closure member closes said opening, flexing of said face portion causing said side walls to pivot away from each other, and magnetic means positioned in each of said side walls for magnetically biasing said side walls toward one another to return said face portion to its normal convex shape when said closure member is open.

8. A cabinet member having an access opening, a closure member for closing said opening, a sealing gasket mounted on one of said members and adapted to contact the other member to seal the space between said members when the closure member closes said opening, said gasket comprising side walls and means connected to one edge of each of said side walls for pivotally supporting said side walls on said one of said members, a flexible, normally convex face portion interconnecting the other edges of said side walls and adapted to abut against a surface composed of magnetic material on the other of said members and to be flexed by said other when said closure member closes said opening, flexing of said face portion causing said side walls to pivot away from each other, magnetic means carried by each of said side walls for moving said side walls toward one another and to return said face portion to its normal convex shape when said closure member is open, said magnetic means in both of said side walls consisting of permanent magnetic material, the relative spacing of said magnetic means and said surface of magnetic material on said other of said members being such that when said closure member is closed the attractive forces between said magnetic material and said permanent magnetic material is sufficient to hold said closure member in the closed position.

References Cited in the file of this patent

UNITED STATES PATENTS

| 2,659,116 | Korb | Nov. 17, 1953 |
| 2,659,118 | Anderson et al. | Nov. 7, 1953 |
| 2,723,896 | Wurtz | Nov. 15, 1955 |